United States Patent [19]

Lundy et al.

[11] Patent Number: 4,847,312
[45] Date of Patent: Jul. 11, 1989

[54] HYDROLYTICALLY STABLE POLYCARBONATE COMPOSITION COMPRISING DICYCLOPENTADIENYL EPOXY ETHER

[75] Inventors: Charles E. Lundy; Sivaram Krishnan, both of Pittsburgh, Pa.

[73] Assignee: Mobay Corporation, Pittsburgh, Pa.

[21] Appl. No.: 227,225

[22] Filed: Aug. 2, 1988

[51] Int. Cl.⁴ ............................................. C08K 5/34
[52] U.S. Cl. ............................. 524/114; 524/109; 524/611; 525/463; 528/198
[58] Field of Search ................ 524/114, 109, 611; 528/198; 525/463

[56] References Cited

U.S. PATENT DOCUMENTS

| | | | |
|---|---|---|---|
| 3,489,716 | 1/1970 | Calkins | 260/45.8 |
| 3,634,312 | 1/1972 | Bialous et al. | 260/45.8 |
| 3,839,247 | 10/1974 | Bialous et al. | 260/18 |
| 3,987,020 | 8/1976 | Liberti | 260/45.8 |
| 4,145,329 | 3/1979 | Mark et al. | 524/114 |
| 4,760,107 | 7/1988 | Nelson | 524/114 |

*Primary Examiner*—Harold D. Anderson
*Attorney, Agent, or Firm*—Gene Harsh; Joseph C. Gil; Aron Preis

[57] ABSTRACT

A polycarbonate molding composition comprising an aromatic polycarbonate resin and a compound conforming to

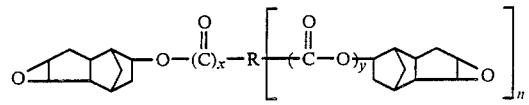

wherein n, x and y independently are 0 or 1 and R is a $C_1$–$C_{20}$ hydrocarbon radical was found to have advantageous hydrolytic stability.

8 Claims, No Drawings

HYDROLYTICALLY STABLE POLYCARBONATE COMPOSITION COMPRISING DICYCLOPENTADIENYL EPOXY ETHER

FIELD OF THE INVENTION

The invention is directed to a polycarbonate composition resistant to hydrolysis and more particularly, to polycarbonate compositions containing an oxirane compound.

BACKGROUND OF THE INVENTION

It has long been recognized that the addition of a small amount of certain oxirane compounds to polycarbonate compositions significantly increases their hydrolytic stability. The prior art is noted to include U.S. Pat. No. 3,489,716 which discloses certain epoxidzed cycloaliphatic compounds as heat and color stabilizers for polycarbonate compositions. U.S. Pat. No. 3,839,247 discloses a water clear hydrolytically stable polycarbonate composition which contains aliphatic or aromatic epoxides. This document explicitly teaches away from using cycloaliphatic epoxides which it characterizes as unsuitable since they result in haziness after steam autoclaving.

Also noted in U.S. Pat. No. 3,978,020 which discloses an epoxide as a co-additive with a phosphonite in the context of a thermally stable or polycarbonate composition. Also noted in the prior art is U.S. Pat. No. 3,634,312 which discloses thermally stable polycarbonate compositions which contain a mixture of a copolycarbonate/phosphite with any of a great number of epoxides.

SUMMARY OF THE INVENTION

It has now been discovered that several of the drawbacks associated with polycarbonate compositions containing prior art epoxides may be eliminated. In addition to imparting to polycarbonate resin an improved level of hydrolytic stability the incorporation of the oxirane compound of the invention improves the stability of the resin at the processing temperature of polycarbonate. In practice of the invention a small amount of a certain oxirane compound is incorporated into the polycarbonate resin and the homogeneous composition is used for molding useful articles.

DESCRIPTION OF THE INVENTION

The present invention resides in the improved resistance to hydrolysis which characterizes a polycarbonate composition and articles molded therefrom which contains a small amount, preferably 0.01 to about 5% by weight, more preferably 0.1 to about 1% by weight of a compound homogeneously blended conforming to

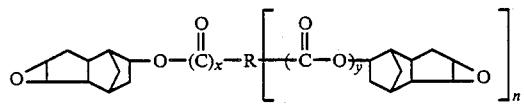

wherein n, x and y independently are 0 or 1 and R is a $C_1-C_{20}$ hydrocarbon radical, preferably a $C_1-C_{20}$ alkyl or alkylidene (branched or linear) $C_6-C_{10}$ aryl, $C_7-C_{20}$ alkylaryl, $C_4-C_{20}$ cycloalkyl or cycloalkylidene or $C_7-C_{11}$ cycloalkyl-aryl radical.

Molding compositions containing the stabilizer of the invention are characterized by their improved hydrolysis resistance combined with improved stability during the molding operation. Articles molded from the composition are characterized by their improved hydrolytic stability and impact strength, compared to prior art counterparts which contain other epoxides.

The polycarbonate useful in the practice of the invention are homopolycarbonates, copolycarbonates and terpolycarbonates or mixtures thereof. The polycarbonates generally have a weight average molecular weight of 10,000-200,000, preferably 20,000-80,000 and their melt flow rate, per ASTM D-1238 at 300° C., is about 1 to about 65 gm/10 min., preferably about 2-24 gm/10 min. They may be prepared, for example, by the known diphasic interface process from a carbonic acid derivative such as phosgene and dihydroxy compounds by polycondensation (see German Offenlegungsschriften Nos. 2,063,050; 2,063,052; 1,570,703; 2,211,956; 2,211,957 and 2,248,817; French Pat. No. 1,561,518; and the monograph H. Schnell, "Chemistry and Physics of Polycarbonates", Intersciences Publishers, New York, 1964, all incorporated herein by reference).

In the present context, dihydroxy compounds suitable for the preparation of the polycarbonates of the invention conform to the structural formulae (1) or (2)

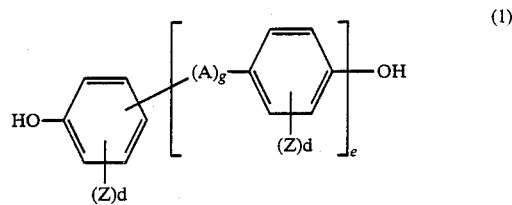

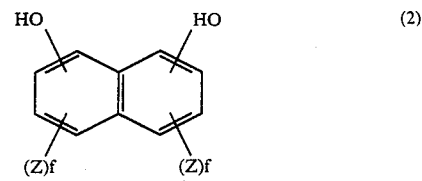

wherein A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

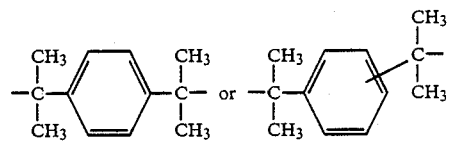

wherein e and g both denote the number 0 to 1; Z denotes F, Cl, Br or $C_1-C_4$-alkyl and if several Z radicals are substituents in one aryl radical, they may be identical or different one from the other; d denotes an integer of from 0 to 4; and f denotes an integer of from 0 to 3.

Among the dihydroxy compounds useful in the practice of the invention are hydroquinone, resorcinol, bis-(hydroxyphenyl) alkanes, bis-(hydroxyphenyl) ethers, bis-(hydroxyphenyl)-ketones, bis-(hydroxyphenyl)sulfoxides, bis-(hydroxyphenyl)-sulfides, bis-(hydroxyphenyl)-sulfones, and a alpha,alpha'-bis-(hydroxyphenyl)diisopropyl-benzenes, as well as their nuclearalkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol-A), 2,4-bis-(4-hydroxyphenyl)-2-methyl-butane, 1,1-bis-(4-hydroxyphenyl)-cyclohexane, alpha,alpha'-bis-(4-hydroxy-phenyl)-p-diisopropylbenzene, 2,2-bis-(3-methyl-4-hydroxyphenyl)-propane, 2,2-bis-(3-chloro-4-hydroxy-phenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-cyclohexane, alpha,alpha-bis-(3,5-dimethyl-4-hydroxyphenyl)-p-diisopropylbenzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol-A).

The polycarbonate of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of polyhydroxyl compound. Polycarbonates of this type have been described, for example, in German Offenlegungsschriften Nos. 1,570,533; 2,116,974 and 2,113,374; British Pat. Nos. 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenyl-methane; 2,2-bis-[4,4-(4,4'-dihydroxydiphenyl)-cyclohexyl]-propane; 2,4-bis-(4-hydroxy-1-isopropyl-idine)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

Suitable monohydric aromatic hydroxy compounds for regulating the molecular weight of polycarbonate resins are monophenols $C_1$–$C_{12}$ alkyl or halogen or substituted monophenols such as m- and p-methyl phenol, m- and p-ethyl phenol, m- and p-propylphenol and m- and p-isopropylphenol; p-bromophenol and m- and p-butylphenol; p-tert-butylphenol is preferred.

In addition to the polycondensation process mentioned above, other processes for the preparation of the polycarbonates of the invention are polycondensates in a homogeneous phase and transesterification. The suitable processes are dislcosed in the incorporated herein by references U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as are disclosed in U.S. Pat. No. 3,912,688, incorporated herein by reference, may be used.

Suitable polycarbonate resins are available in commerce, for instance, Makrolon FCR-2400, Makrolon-2600, Makrolon-2808 and Makrolon-3100, all of which are bisphenol A based homopolycarbonate resins differing in terms of their respective molecular weights and characterized in that their melt flow indices (MFR) per ASTM-D-1238 are about 16.5–24, 13–16, 7.5–13.0 and 3.5–6.5 gm/10 min., respectively. These are products of Mobay Corporation, of Pittsburgh, Pa.

The preparation of the stabilizer of the present invention is known. It may be prepared by an epoxidation reaction of a dicyclopentadiene ester derivative or by epoxidation of a dicyclopentadiene ether derivative. Suitable compounds useful as stabilizers in the present context are commercially available from Viking Chemicals.

Compositions within the scope of the invention have been prepared and their properties determined as summarized below. In the following examples all parts and percentages are by weight unless otherwise specified.

EXAMPLES

Example 1

Compositions containing a polycarbonate resin (Makrolon 2808 from Mobay Corporation) and 0.2% of either one of the stabilizers which are represented below were prepared by conventional methods for the preparation of thermoplastic molding compositions. The stabilizer in Example 2 was dicyclopentadienebenzyl ether epoxide (DCP-E) conforming to

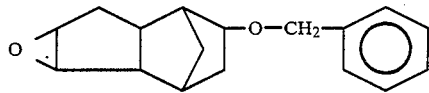

and the stabilizer in Example 3 was diepoxydicyclopentadiene adipate (DCP-A) conforming to

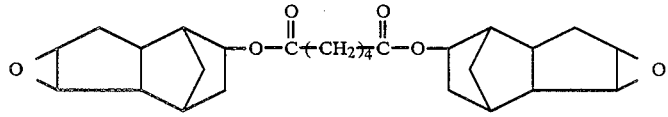

The compositions were subjected to hydrolysis in an autoclave at 121° C. and their melt flow rate (MFR) determined after 24 hours and after 48 hours. The table below describes the effect of hydrolysis on the compositions of the invention set in comparison to a polycarbonate resin which contains no stabilizer. (In the tables, DCP refers to epoxidized dicyclopentadiene).

| Example | MFR (Original) | MFR (after 48 hr autoclaving) | MFR (after 48 hr autoclaving) |
| --- | --- | --- | --- |
| 1. (control) | 14.8 | 23.4 | 31.2 |
| 2. 0.2% DCP-E | 15.8 | 21.4 | 24.9 |
| 3. 0.2% DCP-A | 15.3 | 21.1 | 24.4 |

As is clearly shown by the table the addition of the stabilizers of the invention significantly reduces the deteriorating effect of hydrolysis on polycarbonate.

Example 2

Further compositions within the scope of the invention containing dicyclopentadienebenzyl ether epoxide and diepoxy dicyclopentadiene adipate were prepared and their properties determined. The bisphenol-A based homo-polycarbonate resins used in these examples were Makrolon 2508 and Makrolon 2408 which have a weight average molecular weight of 26,500–28,000 and 25,000–26,000 respectively. The compositions were prepared using conventional methods and test specimens were injection molded. Examples containing a prior art epoxy, 3,4-epoxy cyclohexyl methyl-3,4-epoxy cyclohexane carboxylate (ERL 4221) conforming to

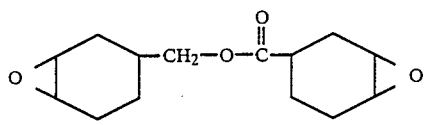

were prepared and tested for comparison. In Examples 4, 5 and 6, all based on Makrolon 2508, the melt flow rate of the neat resin is seen to be unchanged upon the incorporation of 0.2% of the stabilizer of the invention. The effect of hydrolysis (48 hours of autoclaving at 121° C.) is noted to be a significant increase in melt flow rate. The compositions of the invention, containing DCP-E represented by Example 5 and containing DCP-A represented by Example 6, show a considerably lower melt flow rate, which is indicative of greater resistance to deterioration due to hydrolysis. Examples 7, 8 and 9 were based on Makrolon 2408. Example 7 contains no additives. Example 8 contains 0.2% of DCP-diepoxyether (DCP-DEE) conforming to

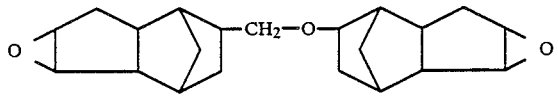

and Example 9 contains 0.2% of ERL 4221. The table below summarizes the results

| Example | Melt Flow Rate (before autoclaving) | Melt Flow Rate (after autoclaving) |
| --- | --- | --- |
| 4. (control) | 14.8 | 31.2 |
| 5. 0.2% DCP-E | 14.0 | 24.9 |
| 6. 0.2% DCP-A | 14.3 | 24.4 |
| 7. (control) | 22.2 | 39.8 |
| 8. 0.2% DCP-DEE | 22.2 | 26.7 |
| 9. 0.2% ERL-4221 | 23.8 | 27.9 |

In a different set of experiments, a comparison was made between the stabilized compositions in terms of the impact strength of articles molded therefrom. Upon exposure to hydrolysis it appears that the stabilizer causes a stiffening effect thereby reducing the Izod impact strength values. The table shows that after 6 and 12 day exposure to 83° C. water, the Izod impact values of polycarbonate containing the stabilizers of the invention are significantly higher than those which contain the prior art epoxy.

| Example | Impact Strength, 6 day autoclaving | Izod (ft. lbs/in) 12 day autoclaving |
| --- | --- | --- |
| 10. (control) | 14.3 | 13.8 |
| 11. 0.2% DCP-DEE | 12.8 | 13.5 |
| 12. 0.2% ERL-4221 | 2.1 | 11.1 |
| 13. (control) | 17.1 | 17.8 |
| 14. 0.2% DCP-DEE | 17.1 | 18.0 |
| 15. 0.2% ERL-4221 | 15.3 | 15.3 |

Examples 10, 11 and 12 were based on Makrolon 2408. The control, Example 10, contained no additive while Examples 11 and 12, contain 0.2% of DCP-DEE and ERL-4221 respectively. The set of Examples 13-15 parallels the above except that they were based on Makrolon 3108.

The molding compositions of the invention may be prepared by following conventional procedures. The stabilizing agent may be introduced by directly mixing it with the polycarbonate. Other conventional additives may also be incorporated in the composition for their art recognized utility. These include release agents, plasticizers, stabilizers, antioxidants, fillers, reinforcing agents and the like.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polycarbonate molding composition comprising
   (i) an aromatic polycarbonate resin and
   (ii) a hydrolytically stabilizing amount of an agent conforming to

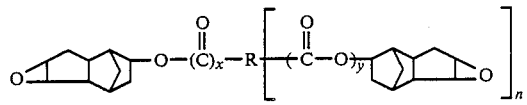

wherein n, x and y independently are 0 or 1 and R is a $C_1$-$C_{20}$ hydrocarbon radical.

2. The molding composition of claim 1 wherein said hydrocarbon radical is a $C_1$-$C_{20}$ alkyl or alkylene radical.

3. The molding composition of claim 1 wherein said hydrocarbon radical is a $C_7$-$C_{20}$ alkylaryl radical.

4. The composition of claim 1 wherein said amount is 0.01 to about 5% relative to the weight of the composition.

5. The molding composition of claim 1 wherein said agent conforms to

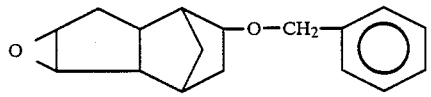

6. The composition of claim 1 wherein said agent conforms to
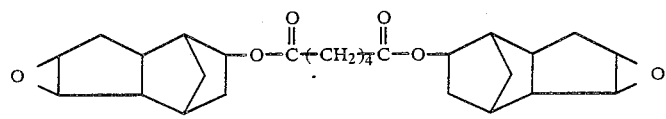
7. The composition of claim 1 wherein said polycarbonate is a homopolymer based on bisphenol-A.
8. The composition of claim 1 wherein said agent conforms to
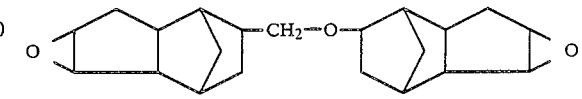
* * * * *